United States Patent
Ffrench et al.

(10) Patent No.: US 9,582,661 B2
(45) Date of Patent: *Feb. 28, 2017

(54) ISOLATED PROGRAM EXECUTION ENVIRONMENT

(71) Applicant: International Business Machines Corporation, Armonk, NY (US)

(72) Inventors: Anthony Ffrench, Medford, MA (US); Libra C. Huang, Taipai (TW); Timothy J. Smith, Raleigh, NC (US); Chih-Wen Su, Taipai (TW); Yi-Hong Wang, Taipai (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/082,376

(22) Filed: Mar. 28, 2016

(65) Prior Publication Data

US 2016/0274876 A1    Sep. 22, 2016

Related U.S. Application Data

(63) Continuation of application No. 14/659,695, filed on Mar. 17, 2015.

(51) Int. Cl.
*G06F 11/00* (2006.01)
*G06F 21/53* (2013.01)
(Continued)

(52) U.S. Cl.
CPC ............. *G06F 21/53* (2013.01); *G06F 8/41* (2013.01); *H04L 63/1408* (2013.01); *H04L 63/1416* (2013.01)

(58) Field of Classification Search
CPC .. G96F 21/53; H04L 63/1416; H04L 63/1408
See application file for complete search history.

(56) References Cited

U.S. PATENT DOCUMENTS

| 6,199,181 B1 * | 3/2001 | Rechef | G06F 21/53 714/38.13 |
| 2007/0220370 A1 * | 9/2007 | Branda | G06F 11/3688 714/49 |

(Continued)

FOREIGN PATENT DOCUMENTS

EP    2259180 A1    12/2010

OTHER PUBLICATIONS

Xinshu Dong et al., "AdSentry: Comprehensive and Flexible Confinement of JavaScript-based Advertisements," 2011 ACM, p. 297-306.*

(Continued)

*Primary Examiner* — Luu Pham
*Assistant Examiner* — Canh Le
(74) *Attorney, Agent, or Firm* — Cantor Colburn LLP; Nicholas Bowman

(57) ABSTRACT

Embodiments relate to an isolated program execution environment. An aspect includes receiving, by the isolated program execution environment on a computer comprising a processor and a memory, a request to run a program. Another aspect includes wrapping program code corresponding to the program as a function. Another aspect includes cloning a real global object of the isolated program execution environment to create a fake global object. Another aspect includes passing the fake global object to the function. Another aspect includes executing the function, such that the function executes the program.

1 Claim, 4 Drawing Sheets

(51) Int. Cl.
*G06F 9/45* (2006.01)
*H04L 29/06* (2006.01)

(56) References Cited

U.S. PATENT DOCUMENTS

| | | |
|---|---|---|
| 2014/0143880 A1 | 5/2014 | Artzi et al. |
| 2014/0195766 A1* | 7/2014 | Taillefer .................. G06F 13/28 |
| | | 711/170 |
| 2016/0094575 A1* | 3/2016 | Shekyan ............. H04L 63/1433 |
| | | 726/25 |

OTHER PUBLICATIONS

Maffeis et al. "Isolating JavaScript with Filters, Rewriting, and Wrappers," ESPRICS 2009, LNCS 5789, pp. 505-522.*

* cited by examiner

ISOLATED PROGRAM EXECUTION ENVIRONMENT

DOMESTIC PRIORITY

This application is a continuation of the legally related U.S. application Ser. No. 14/659,695 filed Mar. 17, 2015, which is fully incorporated herein by reference.

BACKGROUND

The present invention relates generally to computer systems, and more specifically, to an isolated program execution environment for a computer system.

When applying a transactional model into a JavaScript™ platform, JavaScript program code may be compiled and executed repeatedly within an execution environment. When multiple transactions are performed within a shared execution environment, this shared execution environment may be contaminated for future transactions by a transaction. In order to avoid such contamination, after running a JavaScript program within an execution environment, the environment may be restored back to a pristine state. This may be achieved by providing a dedicated execution environment for every transaction. For example, the execution environment may be structured as a separate process that runs each individual JavaScript program. The separate process is created, the JavaScript program is executed, and then the process and memory resources are cleaned up after execution has completed. However, provision of such individual processes may be relatively costly in terms of memory and performance. Another alternative is to use a snapshot-like mechanism. In this approach, a snapshot is taken to record the environment state either before or during execution of a transaction, and the environment is restored after the transaction completes based on the snapshot. For example, if a transaction places an asynchronous call, a snapshot may be taken and another program is be placed into the runtime. However, such an approach may not be feasible in a system that executes multiple simultaneous transactions asynchronously.

SUMMARY

Embodiments include a method, system, and computer program product for an isolated program execution environment. An aspect includes receiving, by the isolated program execution environment on a computer comprising a processor and a memory, a request to run a program. Another aspect includes wrapping program code corresponding to the program as a function. Another aspect includes cloning a real global object of the isolated program execution environment to create a fake global object. Another aspect includes passing the fake global object to the function. Another aspect includes executing the function, such that the function executes the program.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of an isolated program execution environment are provided, with exemplary embodiments being discussed below in detail. In a transactional execution environment that may simultaneously execute multiple programs, such as JavaScript programs, each program may be isolated from any other programs. In order to isolate each program as a transaction, the program code for each program may be wrapped as a function. The function is then executed, executing the JavaScript transaction code inside of it. In order to ensure a pristine state of the execution environment for other transactions, a fake global object is created for each transaction by cloning the real global object of the execution environment, and the fake global object passed to the transaction's function. The program accesses and modifies variables and data in the fake global object during execution. After the execution of the program has completed, the fake global object is discarded. This ensures that no program makes any changes to the global object of the isolated program execution environment. Further, in some embodiments, the isolated program execution environment is run in JavaScript strict mode, which further protects the global object of the execution environment.

Any outside modules, such as library functions, that are required by the various programs in the isolated program execution environment are also protected from modification by the execution of the various programs. When it is determined that a program requires a particular outside module, the outside module code is retrieved from memory, or from a file system, and compiled, and then sealed or frozen such that the compiled module cannot be altered or deleted. The sealed or frozen module is then stored in an immutable module cache, and a reference to the location of the module in the immutable module cache is passed to the program. Once a module has been stored in the immutable module cache, the version of the module in the immutable module cache may be reused by any number of programs in the isolated program execution environment.

Figure 1:
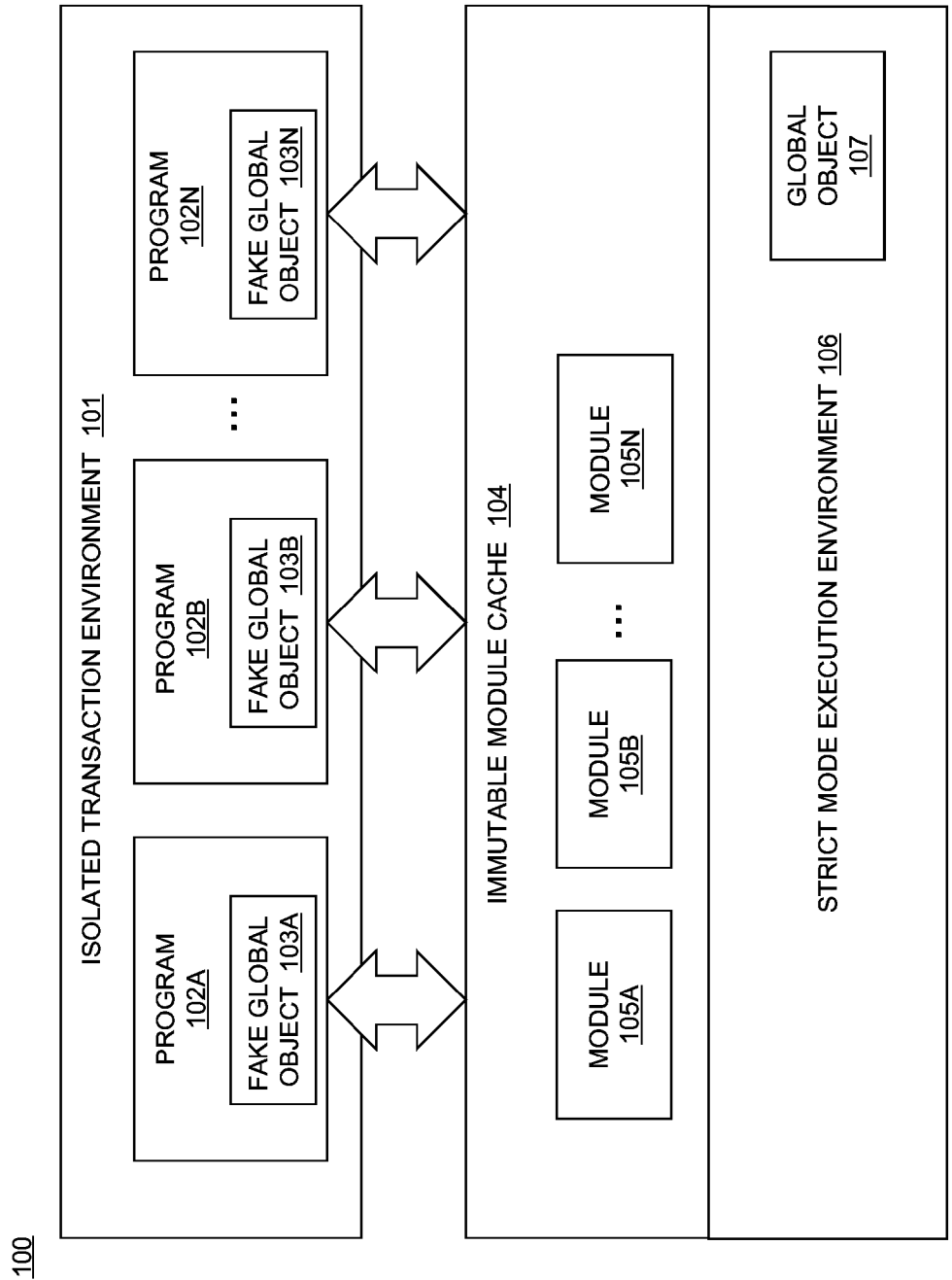
FIG. 1 depicts an isolated program execution environment in accordance with an embodiment.

FIG. 1 depicts an isolated program execution environment 100 in accordance with an embodiment. Isolated program execution environment 100 comprises isolated transaction environment 101, in which a plurality of programs 102A-N may be executed simultaneously as separate transactions. Each of programs 102A-N may comprise a JavaScript program in some embodiments, and, in various embodiments, the programs 102A-N may each run different program code, or two or more of the programs 102A-N may run the same program code. A respective fake global object 103A-N is provided for each of programs 102A-N, so that the programs 102A-N are isolated from one another and do not contaminate the isolated program execution environment 100. During execution, a program, such as program 102A, accesses and modifies variables in its respective fake global object 103A. After the program, such as program 102A, is done executing, the program's respective fake global object 103A is discarded or deleted. Each of programs 102A-N may access one or more of modules 105A-N that are stored in the immutable module cache 104. Modules 105A-N are compiled and sealed, or frozen, such that the modules 105A-N may be called by programs 102A-N, but may not be modified. Execution of programs 102A-N is overseen by strict mode execution environment 106. Global object 107 is part of strict mode execution environment 106; the global object 107 cannot be accessed by any of programs 102A-N or modules 105A-N. FIG. 1 is shown for illustrative purposes only; for example, an isolated transaction environment may run any appropriate number of programs, and an immutable module cache may hold any appropriate number of modules.

In an example, an isolated program execution environment such as isolated program execution environment 100 may be implemented in a packet processor, such that each request that is received by the packet processor triggers execution of a particular program to handle the request, e.g., forward the request from the packet processor to a backend server, receive a response to the request at the packet processor from the backend server, and forward the response to the requestor by the packet processor. Different types of requests may be handled by different JavaScript programs, and multiple programs may be run simultaneously and asynchronously in the isolated program execution environment based on the number and type of received requests in the packet processor.

Figure 2:
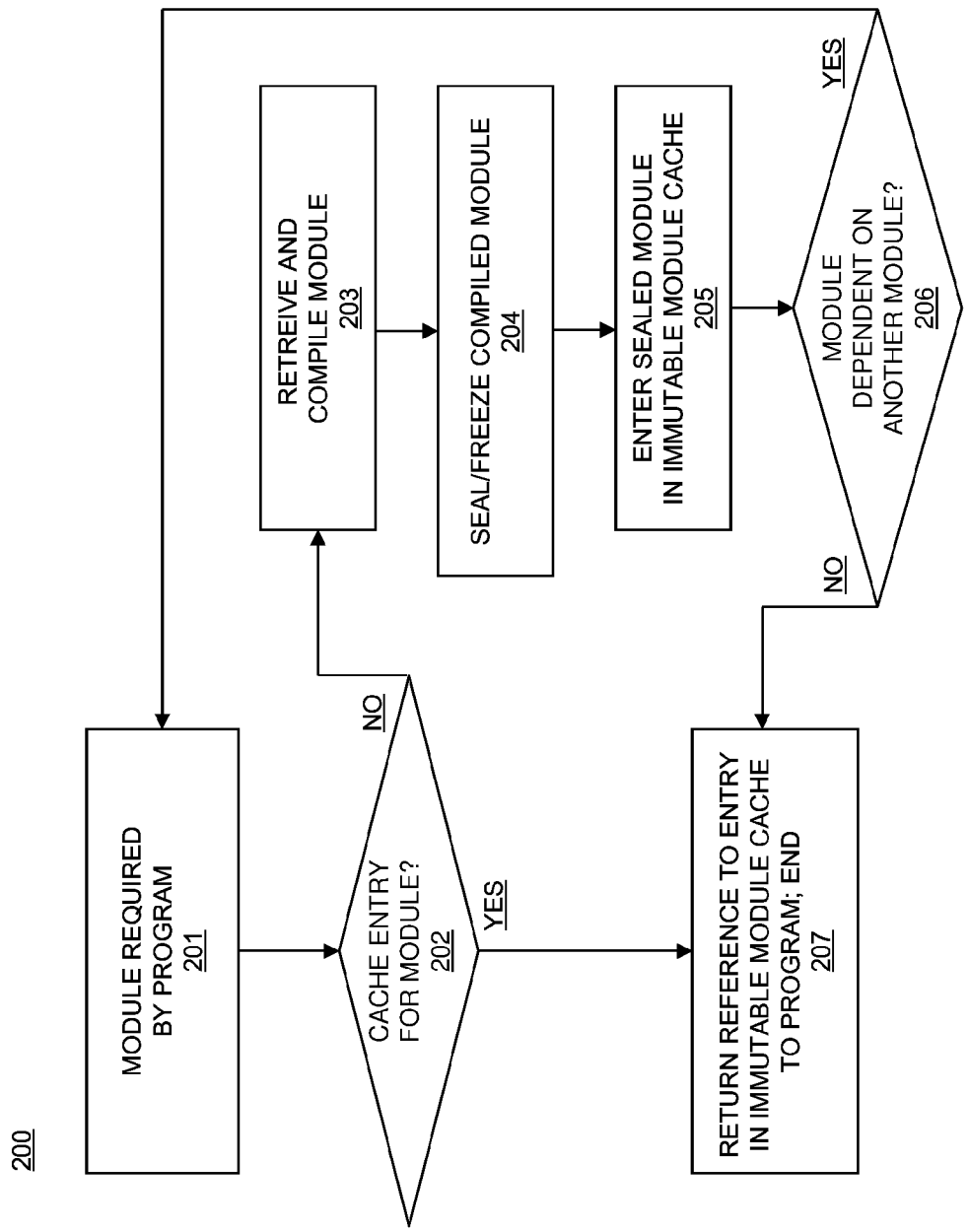
FIG. 2 illustrates a flowchart of a method for providing an immutable module for an isolated program execution environment in accordance with an embodiment.

FIG. 2 illustrates a flowchart of a method 200 for providing an immutable module for an isolated program execution environment in accordance with an embodiment. Method 200 is discussed with respect to FIG. 1. First, in block 201, it is determined that a module is required by a program, such as program 102A. This determination may be made based on, for example, an include statement or a reference to a library module in the program 102A. The required module may be any appropriate type of pre-coded module. Then, in block 202, it is determined whether the required module exists in the immutable module cache 104. If, in block 202, it is determined that the required module exists in the immutable module cache 104, flow proceeds from block 202 to block 207, which is discussed below. If the required module is determined not to exist in the immutable module cache 104 in block 202, flow proceeds to block 203, in which the module is retrieved and compiled. The module may be retrieved from, for example, a library that is located in a memory (for example, a main memory or a file system) that is in communication with the isolated program execution environment 100. Next, in block 204, the compiled module is sealed, or frozen, such that no changes may be made to the compiled module. The module may be sealed or frozen by calling Object.seal or Object.freeze against the module object. The sealed module is then entered into the immutable module cache 104 in block 205. It is then determined in block 206 whether the module that was entered into the immutable module cache 104 in block 205 is dependent (e.g., calls) another module. If it is determined in block 206 that another module is required, flow returns to block 201 from block 206, and blocks 202-206 are repeated for another module. If it is determined in block 206 that the module is not dependent on another module, flow proceeds from block 206 to block 207. In block 207, a reference to the cache entry that holds the sealed module is returned to the program for use during execution, and method 200 ends.

Figure 3:
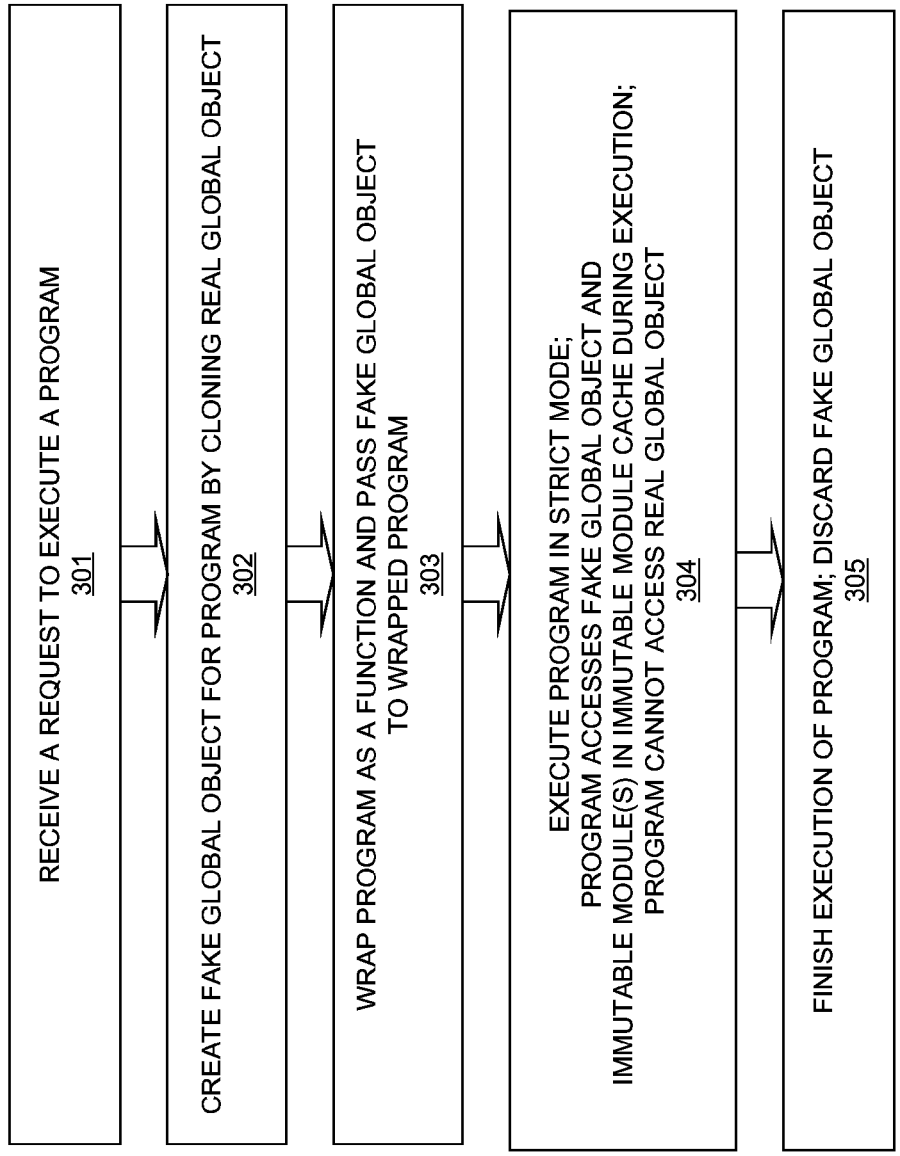
FIG. 3 illustrates a flowchart of a method for execution of a program in an isolated program execution environment in accordance with an embodiment.

FIG. 3 illustrates a flowchart of a method for execution of a program in an isolated program execution environment in accordance with an embodiment. First, in block 301, a request is received to execute a program, and the isolated transaction environment 101 is prepared to execute the program (for example, program 102A) based on the request. In block 302, a fake global object is created for the program. The fake global object may be created by cloning the real global object 107. In block 303, the program is wrapped as a function, and the fake global object is passed to the wrapped program as, for example, fake global object 103A. In block 304, the program 102A executes in strict mode. During execution, the program 102A may access and modify variables in the fake global object 103A; changes to the fake global object 103A do not affect the real global object 107. The program may also access one or more of modules 105A-N in immutable module cache 104; the modules 105A-N are entered into the immutable module cache 104 as needed using method 200 of FIG. 2. Lastly, in block 305, the execution of the program 102A finishes, and the program's fake global object 103A is discarded or deleted. The execution of the program 102A has not modified the execution environment 106, so that the execution environment 106 is not contaminated for other programs.

Figure 4:
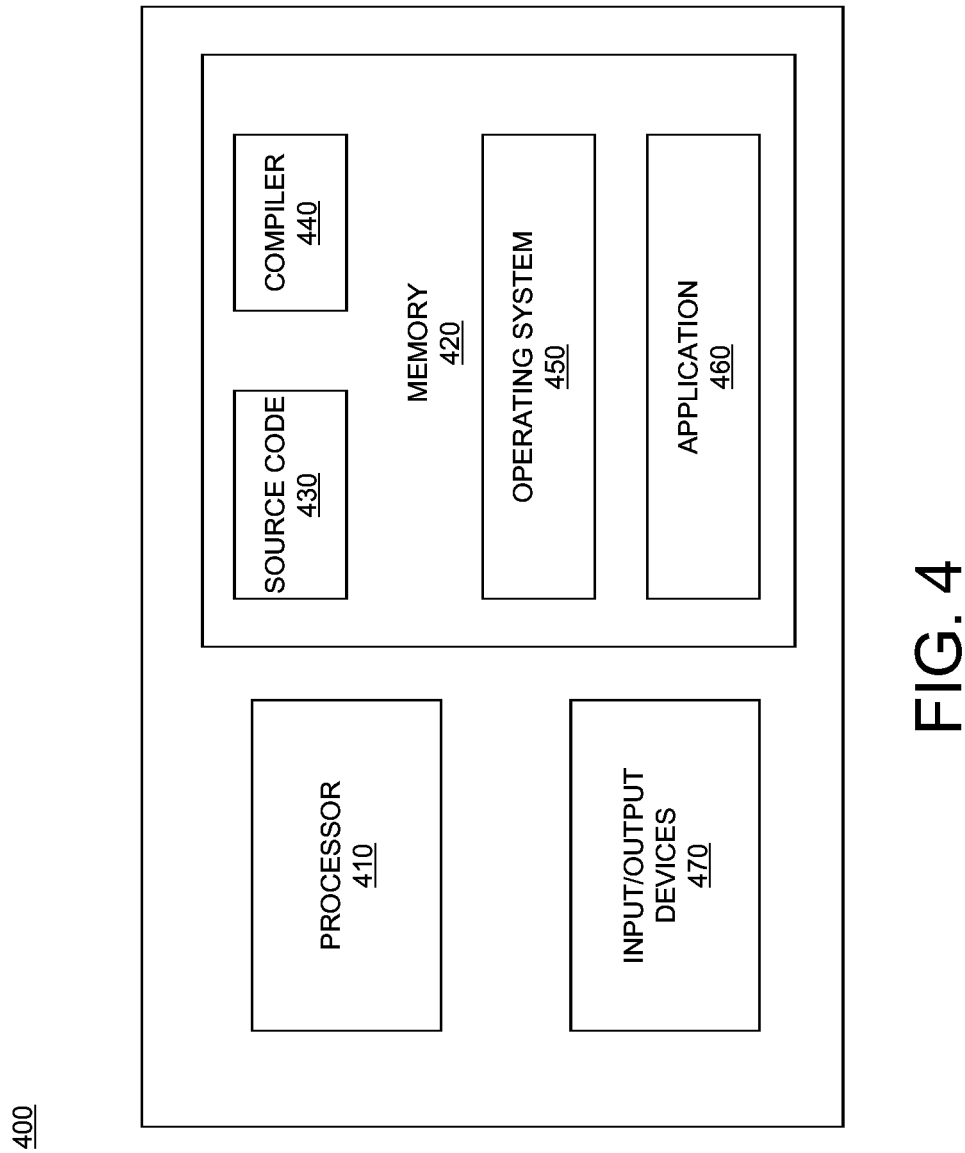
FIG. 4 illustrates a computer for use in conjunction with an isolated program execution environment in accordance with an embodiment.

FIG. 4 illustrates an example of a computer 400 which may be utilized by various embodiments of an isolated program execution environment. Various operations discussed above may utilize the capabilities of the computer 400. One or more of the capabilities of the computer 400 may be incorporated in any element, module, application, and/or component of an isolated program execution environment as discussed herein.

The computer 400 includes, but is not limited to, PCs, workstations, laptops, PDAs, palm devices, servers, storages, and the like. Generally, in terms of hardware architecture, the computer 400 may include one or more processors 410, memory 420, and one or more I/O devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a digital signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. The software in the memory 420 includes a suitable operating system (O/S) 450, compiler 440, source code 430, and one or more applications 460 in accordance with exemplary embodiments. As illustrated, the application 460 comprises numerous functional components for implementing the features and operations of the exemplary embodiments. The application 460 of the computer 400 may represent various applications, computational units, logic, functional units, processes, operations, virtual entities, and/or modules in accordance with exemplary embodiments, but the application 460 is not meant to be a limitation.

The operating system 450 controls the execution of other computer programs, and provides scheduling, input-output control, file and data management, memory management, and communication control and related services. It is contemplated by the inventors that the application 460 for implementing exemplary embodiments may be applicable on all commercially available operating systems.

Application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 470 may include input devices such as, for example but not limited to, a mouse, keyboard, scanner, microphone, camera, etc. Furthermore, the I/O devices 470 may also include output devices, for example but not limited to a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or intranet.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 460 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include isolation of programs from one another in a program execution environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A nonexhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for an isolated program execution environment, the method comprising:
    receiving, by the isolated program execution environment on a computer comprising a processor and a memory, a request to run a program, wherein the program comprises a JavaScript program, and wherein the program is executed in a strict mode;
    wrapping program code corresponding to the program as a function;
    cloning a real global object of the isolated program execution environment to create a fake global object;

passing the fake global object to the function; and
executing the function, such that the function executes the program, wherein the program accesses data or a variable in the fake global object during execution, and does not access the real global object;
discarding the fake global object after execution of the program is completed;
determining that the program requires an external module;
determining whether the external module is stored in an immutable module cache of the isolated program execution environment;
based on determining that the external module is stored in the immutable module cache, passing a reference to a cache entry corresponding to the external module to the program;
executing the external module by the program, wherein the program does not modify the external module during execution;
wherein, based on determining that the external module is not stored in the immutable module cache:
retrieving program code corresponding to the external module from a memory;
compiling the retrieved program code to create a compiled module;
sealing the compiled module so that the sealed compiled module is immutable;
storing the sealed compiled module in the immutable module cache;
executing a plurality of programs simultaneously by the isolated program execution environment, wherein each of the plurality of programs has a respective fake global object.

* * * * *